United States Patent [19]

Turner

[11] 4,221,062

[45] Sep. 9, 1980

[54] APPARATUS FOR DEMONSTRATING TRANSMISSION OF NERVE IMPULSES

[76] Inventor: Bruce E. Turner, 217 Eight Mile Road, Cincinnati, Ohio 45230

[21] Appl. No.: 1,877

[22] Filed: Jan. 8, 1979

[51] Int. Cl.$^3$ .............................................. G09B 23/32
[52] U.S. Cl. ......................................... 35/49; 35/17
[58] Field of Search ........................... 35/17, 19 A, 49; 273/1 M, 239; 46/236, 237, 238, 239, 240

[56] References Cited

U.S. PATENT DOCUMENTS

| | | | |
|---|---|---|---|
| 3,121,565 | 2/1964 | Mentzer | 46/236 X |
| 3,358,676 | 12/1967 | Frei | 46/239 X |
| 3,391,477 | 7/1968 | Michalek | 35/49 |
| 3,426,453 | 2/1969 | Dingwall | 35/61 |
| 3,543,146 | 11/1970 | Sherwood | 273/239 X |
| 3,606,314 | 9/1971 | Popp | 35/19 A X |

FOREIGN PATENT DOCUMENTS

467930  6/1937  United Kingdom ..................... 46/236

*Primary Examiner*—Harland S. Skogquist
*Attorney, Agent, or Firm*—Frost & Jacobs

[57] ABSTRACT

Device for simulating passage of neurochemical transmitters from a presynaptic neuron across a synaptic cleft to a postsynaptic neuron and simulating the effect of an antidepressant drug, comprising a pair of elongated non-magnetizable members each having a bulbous end portion, each end portion having a substantially flat face, means exerting a magnetic field in each bulbous end portion, the means being so oriented that the magnetic fields oppose one another when the flat faces are brought into approaching relation, one of the magnetic fields being stronger than the other at the flat face, and a flat magnetizable disc. When the magnetizable disc is held on the flat face having the weaker magnetic field, and the flat faces are brought into approaching face-to-face relation, the disc is attracted by the stronger magnetic field and traverses the gap between the faces, clinging to the face having the stronger magnetic field.

11 Claims, 4 Drawing Figures

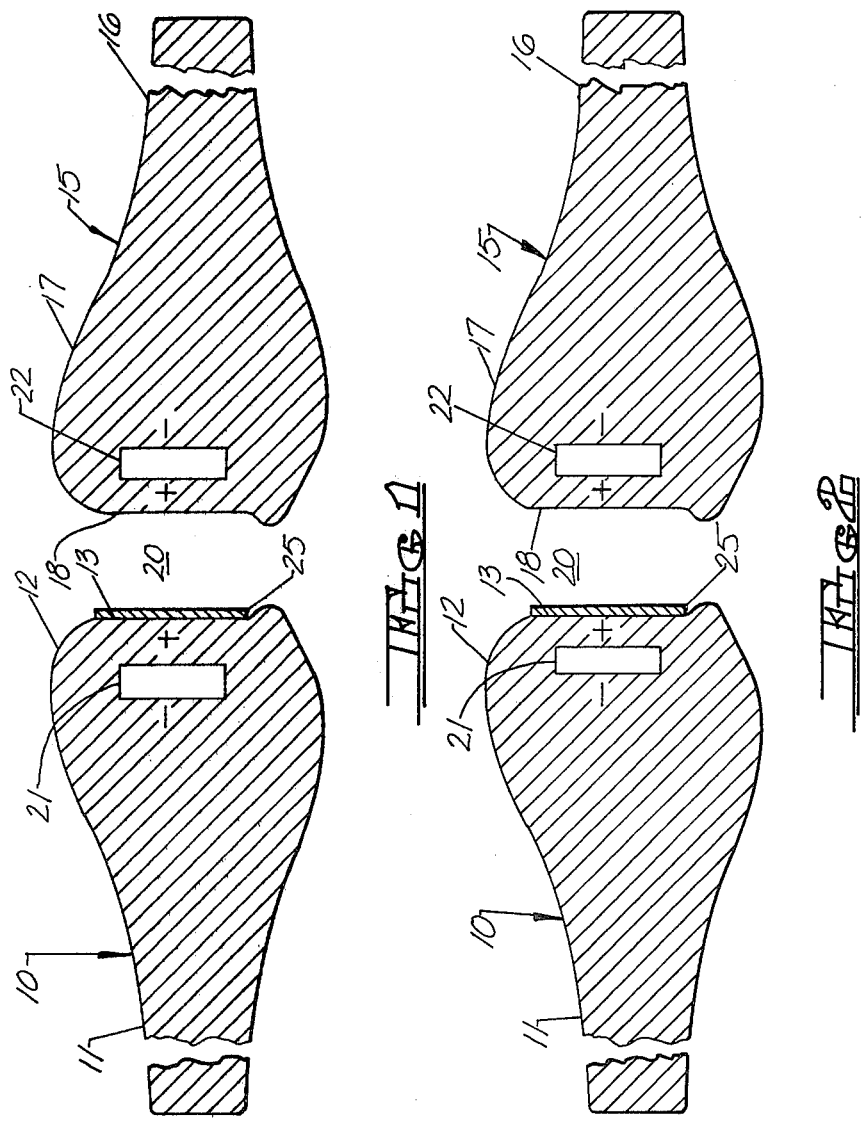

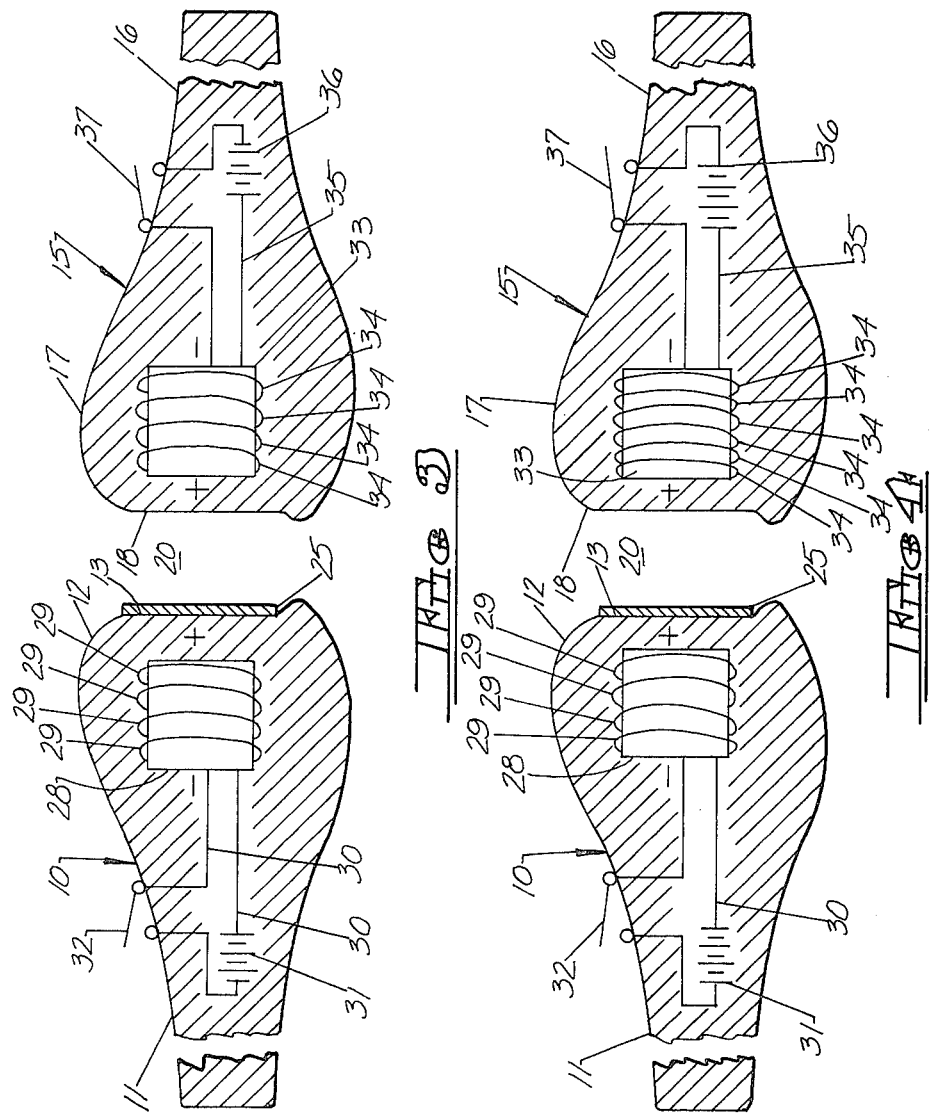

APPARATUS FOR DEMONSTRATING TRANSMISSION OF NERVE IMPULSES

BRIEF SUMMARY OF THE INVENTION

The present invention relates to a device for simulating the transmission of impulses in the brain by passage of neurochemical transmitters from a presynaptic neuron across a synaptic cleft to a postsynaptic neuron, and for simulating the effect of an antidepressant drug in blocking re-uptake of the neurochemical transmitters by the presynaptic neuron.

By way of background, an article by Allen B. Adolphe, Ph.D., E. Richard Dorsey, M.D. and Michael J. Napoliello, M.D., entitled "The Neuropharmacology of Depression", *Diseases Of The Nervous System, Vol.* 38, Issue 10, pages 841–846 (October 1972), summarizes the current theories regarding transmission of impulses in the human nervous system, the effect of a deficiency of neurochemical transmitters at functionally important adrenergic receptor sites in the brain, and the action of the three currently used types of antidepressant medications. Briefly, it is postulated that when functioning normally a nerve cell actively passes an electric current by an exchange of sodium and potassium ions located in the membrane of the nerve cell. When this current reaches storage vesicles in a presynaptic neuron, neurochemical transmitters stored therein are released and traverse a synaptic cleft or synapse from which they are absorbed by and bound briefly to a postsynaptic neuron or receptor. The neurotransmitters are then released back into the synaptic cleft from which most of the neurotransmitters are reabsorbed by the presynaptic neuron and restored in storage vesicles. The remainder is metabolized in the synapse by one or more enzymes.

The "Catecholamine Hypothesis" (introduced by Dr. J. J. Schildkraut, *Amer.Journ.Psychiat.* 122:509–522, 1965) postulates that mental depression is associated with a relative deficiency of neurochemical transmitters, particularly norepinephrine, at functionally important adrenergic receptor sites in the brain. Thus, the normal process of release and re-uptake of the neurotransmitters is interrupted.

The effect of a tricyclic antidepressant is apparently to block the re-uptake of the neurochemical transmitter from the synaptic cleft. This increases the concentration of the neurotransmitter at the receptor site, thereby making these available to be bound briefly to the postsynaptic neuron or receptor.

The present invention provides a model on an enlarged scale representing a presynaptic neuron, a postsynaptic neuron, and a magnetizable disc, preferably having a plurality of colored dots on each side illustrating neurochemical transmitters. Opposed magnetic fields are provided in each neuron model so that the magnetizable disc is held initially on the face of the presynaptic neuron model, but when brought into approaching relation to a face of a postsynaptic neuron model the disc traverses the gap between the two neuron models and clings to a face of the postsynaptic neuron.

The apparatus of the present invention has utility in demonstrations by salespersons to physicians, and by physicians to their patients and families of patients, the effect of an antidepressant drug, and as a teaching aid in medical and nursing schools.

U.S. Pat. No. 3,358,676 discloses a technique for moving diagnostic or therapeutic elements through the body ducts of animals or humans. Each of the elements contains a small magnet.

U.S. Pat. No. 3,606,314 discloses a teaching game which includes magnets connected to handles wherein the user attempts to mate corresponding pieces in order to develop manual dexterity.

U.S. Pat. Nos. 2,589,601 and 3,883,988 relate to magnetic games wherein small magnetic pieces may be rearranged by a magnet.

U.S. Pat. No. 3,426,453 discloses a magnetic display device in which magnetic pieces are rearranged in a desired pattern by means of a magnetic writing stylus.

No prior art of which applicants are aware contains any suggestion of apparatus having the structure and function of the present invention.

According to the invention there is provided apparatus for simulating passage of neurochemical transmitters from a presynaptic neuron across a synaptic cleft to a postsynaptic neuron and for simulating the effect of an antidepressant drug in blocking re-uptake of the neurochemical transmitters by the presynaptic neuron, comprising a pair of elongated non-magnetizable members each having an enlarged, bulbous end portion, each end portion having a substantially flat face, means exerting a magnetic field in each bulbous end portion, the means being so oriented that the magnetic fields oppose one another when the flat faces are brought into approaching face-to-face relation, one of the magnetic fields being stronger than the other at the flat face, and a magnetizable disc attracted by the magnetic fields, whereby when the magnetizable disc is attracted by and held initially on the flat face having the weaker magnetic field and the flat faces are brought into approaching face-to-face relation, the disc is attracted by the stronger magnetic field and traverses the gap between the faces to the face having the stronger magnetic field.

BRIEF DESCRIPTION OF THE DRAWING

Reference is made to the accompanying drawing wherein:

FIG. 1 is a sectional view of a preferred embodiment of the elements of the invention;

FIG. 2 is a sectional view of another embodiment of the invention;

FIG. 3 is a sectional view of a further embodiment of the invention; and

FIG. 4 is another embodiment of the invention.

DETAILED DESCRIPTION

In the various figures of the attached drawing like elements are designated by like reference numerals.

Referring to FIG. 1, a presynaptic neuron is indicated generally at 10. It comprises an elongated member preferably having a generally cylindrical portion 11, and an enlarged, bulbous end portion 12, the end portion terminating in a substantially flat face 13.

A postsynaptic neuron is indicated generally at 15. It has a configuration similar to that of the member 10, comprising a generally cylindrical portion 16 and an enlarged, bulbous end portion 17 terminating in a substantially flat face 18.

As shown in the drawing when the flat faces 13 and 18 are brought into approaching face-to-face relation, the gap or space therebetween simulates a synaptic cleft or synapse designated as 20 in the various figures of the drawing.

The members 10 and 15 are of non-magnetizable material and may be cast or molded plaster, resin, and the like. Preferably the bulbous end portions 12 and 17 are solid, while the generally cylindrical sections 11 and 16 may be hollow in order to reduce the total weight. Alternatively, the members 10 and 15 could be fabricated from wood, particle board, and the like.

Preferably, the surfaces of members 10 and 15 are painted or stained with an appropriate color and identified by printed indicia or the like as presynaptic neuron and postsynaptic neuron, respectively.

In the embodiment of FIG. 1 member 10 is provided with a permanent magnet 21 within enlarged end portion 12 and illustrated as having its positive or North pole adjacent flat face 13. If member 10 is formed of cast or molded material, the magnet 21 may readily be imbedded during the casting or molding process and will be fixed a predetermined distance from flat face 13, e.g., one half inch, by the setting or solidification of the plaster, resin or other non-magnetizable material from which member 10 is formed.

In member 15 a second permanent magnet 22 is provided in the enlarged end portion 17. In the embodiment of FIG. 1, magnet 22 has a magnetic field of the same strength as that of magnet 21 and its positive or North pole also is adjacent flat face 18. However, magnet 22 is fixed a predetermined distance from flat face 18 which is less than the distance of magnet 21 from flat face 13, so that magnet 22 exerts a stronger magnetic field at flat face 18 than the magnetic field exerted at flat face 13.

As shown in FIG. 1, a flat circular disk 25 is provided which is formed from ferritic stainless steel or other metal which is magnetizable. Preferably the two flat faces of disc 25 are provided with a plurality of colored dots representing neurotransmitters. Preferably the diameter of disc 25 is about equal to that of flat faces 13 and 18. This disc is initially positioned on flat face 13 of member 10 where it is held by the magnetic field of permanent magnet 21. For demonstration purposes members 10 and 15 are moved manually into approaching face-to-face relation. At some point where the synapse 20 is on the order of several inches, the stronger magnetic field exerted by magnet 22 at flat face 18 causes the disc 25 to traverse or jump across the gap 20 from flat face 13 and cling to flat face 18. The repelling force of the opposing magnetic fields can be plainly felt by the person holding the members 10 and 15 when these are brought into approaching face-to-face relation.

This demonstration simulates first the existence of an abnormal condition where no neurotransmitters are traversing the synapse, and next the return to a normal condition, resulting from administration of an antidepression drug, wherein neurotransmitters traverse the synapse from a presynaptic neuron to a postsynaptic neuron in the human brain. Since the disc 25 cannot be attracted back to the weaker magnetic field 13 of member 10 regardless of how close the flat faces 13 and 18 are brought to one another, the demonstration also simulates the effect of an anti-depressant drug such as a tricyclic antidepressant in blocking the re-uptake of the neurotransmitter from the receptor.

In the embodiment of FIG. 2, permanent magnets 21 and 22 are each positioned the same distance from the respective flat faces 13 and 18, but magnet 22 has a stronger magnetic field, so that a stronger field is exerted at flat face 18. As in the embodiment of FIG. 1, the magnetic fields oppose one another, and each magnet 21 and 22 may be fixed the same distance from its respective flat face 13 and 18, e.g. ¼ to ½ inch.

In the embodiment of FIG. 3, member 10 is provided with an electromagnet comprising a core 28, a coil 29, a circuit 30 connecting coil 29 to a battery 31. A switch 32 is provided in circuit 30 in order to connect the coil to the source of electric current provided by battery 31. As illustrated in FIG. 3, the effect is to produce a positive pole in core 28 adjacent flat face 13.

Core 28 is fixed a predetermined distance from flat face 13 in the same manner as described above with respect to permanent magnet 21 in FIG. 1.

Member 15 in FIG. 3 is also provided with a permanent magnet comprising a core 33, a coil 34, a circuit 35 connecting the coil 34 to a battery 36. A switch 37 is provided in circuit 35 in order to permit a flow of current through coil 34 thus creating a magnetic field of the same strength as that created in member 10. Core 33, is fixed in the enlarged portion 17 a predetermined distance between core 28 and flat face 13 of member 10. Thus, as in the embodiment of FIG. 1, a stronger magnetic field is exerted at face 18 than at face 13.

In the embodiment of FIG. 4 an electromagnet is provided in member 10 having the same elements as described above in connection with FIG. 3. Member 15 in FIG. 4 is also provided with an electromagnet having the same elements as described above in connection with FIG. 3. However, the embodiment of FIG. 4 differs in that coil 34 in member 15 has a greater number of turns and hence exerts a stronger magnetic field than the electromagnet in member 10. In this embodiment both cores 28 and 33 are fixed the same distance from the respective flat faces 13 and 18, so that a stronger magnetic field is exerted at flat face 18 than at flat face 13.

From the above description of the embodiments of FIGS. 2, 3 and 4, it is evident that these function in the same manner as the embodiment of FIG. 1 for demonstration purposes in simulating passage of neurochemical transmitters from a presynaptic neuron across a synaptic cleft to a postsynaptic neuron and simulating the effect of an antidepressant drug in blocking re-uptake of the neurochemical transmitters by the presynaptic neuron.

It has been found that excellent results are obtained in the embodiments of FIGS. 1 and 2 using permanent magnets formed from barium ferrite embedded in a flexible rubber matrix. Each magnet may have an area of about 1 square inch and a thickness ranging from ⅛ to ½ inch in the embodiment of FIG. 1, it being understood that each thickness will be the same. In the embodiment of FIG. 2 the thickness of magnet 21 (presynaptic neuron model) may be about ⅛ inch, while the thickness of magnet 22 (postsynaptic neuron model) may be about ½ inch.

While the invention has been described in several preferred embodiments, modifications may be made without departing from the spirit and scope of the invention. Accordingly, no limitations are to be inferred except as set forth in the appended claims.

I claim:

1. Apparatus for simulating passage of neurochemical transmitters from a presynaptic neuron across a synaptic cleft to a postsynaptic neuron and for simulating the effect of an antidepressant drug in blocking re-uptake of said neurochemical transmitters by said presynaptic neuron, said apparatus comprising a pair of elongated non-magnetizable members each having an enlarged, bulbous end portion, each said end portion having a substantially flat face, means exerting a magnetic field in each said bulbous end portion, said means being so oriented that the magnetic fields oppose one another when said flat faces are brought into approaching face-to-face relation, one of said magnetic fields being stronger than the other at said flat face, and a magnetizable disc attracted by said magnetic fields, whereby when said magnetizable disc is attracted by and held initially on said flat face having the weaker magnetic field and the flat faces are brought into approaching face-to-face relation, said disc is attracted by said stronger magnetic field and traverses the gap between said faces to said face having said stronger magnetic field.

2. The apparatus claimed in claim 1, wherein each said means exerting a magnetic field is a permanent magnet positioned within a respective enlarged end portion, with like poles adjacent said flat faces.

3. The apparatus claimed in claim 2, wherein one of said magnets is positioned closer to its respective flat face than the other, whereby to exert a stronger magnetic field at said face.

4. The apparatus claimed in claim 2, wherein one of said magnets exerts a stronger magnetic field than the other, and each is positioned equidistantly from its respective flat face.

5. The apparatus claimed in claim 1, wherein each said means exerting a magnetic field is an electromagnet positioned within a respective enlarged end portion, with like poles adjacent said flat faces.

6. The apparatus claimed in claim 5, wherein one of said electromagnets is positioned closer to its respective flat face than the other, whereby to create a stronger magnetic field at said face when activated.

7. The apparatus claimed in claim 5, wherein one of said electromagnets exerts a stronger magnetic field than the other when activated, and each is positioned equidistantly from its respective flat face.

8. The apparatus claimed in claim 1, wherein said magnetizable disc has a flat, circular configuration and is formed from ferritic stainless steel.

9. The apparatus claimed in claim 8, wherein each face of said disc is provided with a plurality of colored dots representing neurotransmitters.

10. The apparatus claimed in claim 1, wherein said elongated members are cast or molded plaster, resin, and the like.

11. The apparatus claimed in claim 1, wherein said elongated members are wood.

* * * * *